April 15, 1958  L. V. SORG ET AL  2,830,738
FLUID SAMPLE INJECTION APPARATUS
Filed June 28, 1956

INVENTORS:
Leonard V. Sorg
John C. Lamkin

BY Everett A. Johnson
ATTORNEY

United States Patent Office 2,830,738
Patented Apr. 15, 1958

2,830,738

FLUID SAMPLE INJECTION APPARATUS

Leonard V. Sorg, Kansas City, and John C. Lamkin, Independence, Mo., assignors to Standard Oil Company, Chicago, Ill., a corporation of Indiana Application June 28, 1956, Serial No. 594,573

5 Claims. (Cl. 222—133)

This invention relates to injecting small samples of gases or liquids into a flowing stream. More particularly, it pertains to a device for injecting measured samples into gas chromatography apparatus.

Work in connection with gas chromatography requires the injection of samples of less than 1 ml. and of the order of 1 to 40 microliters into a chromatographic column through which an eluting gas flows. Many of the samples are liquified petroleum gases and it is necessary either to volatilize them completely or to inject them as a liquid into the column, and, in either event, without losing any of the lighter components. It is also desired to introduce, repeatedly, samples of uniform volume. Further, it is desired to introduce successive samples of varying volume without disturbing the gas chromatographic column installation. Another difficulty is that prior systems inherently introduce air with the sample which hinders fractionation in the column.

It is, therefore, a primary object of this invention to provide a system for injecting small samples into a chromatographic column or system which avoids the difficulties heretofore encountered. It is a further object of the invention to provide a measuring valve structure which is rugged in construction, is foolproof in operation, and is well adapted for introducing selected volumes of samples into gas chromatographic apparatus. An additional object is to prevent the inclusion of air with the liquid sample during its introduction into the column. These and other objects of our invention will become apparent as the description thereof proceeds.

Briefly, we attain the objects of the invention by providing a stopcock construction having two or more channels of different bore which determine the size of the sample. Each channel has its inlet and outlet on the same surface of the stopcock plug and rotation of the plug 90° traps the sample within the barrel or housing of the stopcock. Rotation through 180° diverts the sample into the flowing stream. Taps connected to the flowing stream divert the stream through the barrel or housing and cause series flow of fluids through the inlet tap, the measuring channel within the stopcock plug, and out through the outlet tap.

A difficult problem solved by our device is the introduction of volatile liquid samples. By sampling and delivering the sample as a liquid, as distinguished from vaporized samples, we avoid any fractionation and the refrigerating effects which occur during vaporization of the sample and, thus, deliver analytically uniform or true samples.

Further details and advantages of our invention will be described in connection with the accompanying drawings illustrating a preferred embodiment and wherein.

Figure 2:
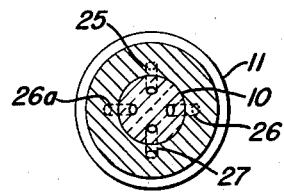
Figure 2 is a section of the meter plug taken along the line 2—2 in Figure 1.

Referring to the drawings, the measuring valve of the present invention, in the preferred embodiment illustrated, is comprised of a tapered metering plug 10 within the barrel or body 11. The plug 10 as shown is provided with a shank 12 which accommodates a coil spring 13, a washer 14 and a pin 16 which is passed through the end of the shank 12. The plug 10 is held in place within the body 11 by the spring 13 which acts against the washers 14 and 15. The body 11 is provided with four tubes or taps 17, 18, 19 and 20 which extend into the hollow chamber 11a in body 11 and communicate with bores 21 to 24 therein.

Drilled into the plug 10 are measuring channels 25, 26, 26a and 27, the inlet and outlet of these channels being so aligned that a gas or liquid entering through 17 will pass through the channel 25 and out through tap 18. If the gas or liquid is introduced into tap 19, it is passed through channel 27 and out tap 20.

The diameter and length of the channels 25, 26, 26a and 27 governs the sample size. Thus, by using different sized channels 25, 26, 26a and 27, variable samples may be handled with a single tapered plug 10. The inlet and outlet of each of channels 25, 26, 26a and 27 are equispaced so that they can be brought into alignment selectively with the bores 21—22 or the bores 23—24.

In the operation of the device, taps 19 and 20 are connected to the flowing stream so that the flow is through channel 27. The tap 17 is then connected to the sample source 28 and the sample is purged through channel 25 until it emerges freely from the tap 18. If desired, the sample source 28 may be of the leveling-bulb type and connected to inlet tap 17 by a flexible connector 29.

When a full sample is disposed within channel 25, the plug 10 is turned about 180° and the sample trapped within channel 25 is dumped into the stream flowing through line 30 and taps 19 and 20. If, after the channel 25 has been filled, the plug 10 is turned only about 90°, the sample remains trapped within the plug 10 sealed within channel 25 by the wall of the barrel 11 so that the sample may be discharged at a later time.

A handle 31 is attached to the plug 10 by a screw 32 and a pin 33. This permits the turning of the plug 10. The handle 31 is indexed with respect to the channels 25, 26, 26a and 27 so that the position of channels 25, 26, 26a and 27, aligned with taps 17—18 or taps 19—20, is clearly identified to the operator. Likewise, the channels 25, 26, 26a and 27 may be arranged to discharge through the shank 12 into a conduit means (not shown).

Any suitable materials of construction may be used for the device. The plug 10 and the barrel 11 may be made of glass, but it is also contemplated that other materials such as metals, nylon, Teflon and generally any material not affecting the properties of the samples or the flowing stream may be used.

However, we prefer to employ a brass barrel 11 and a plug 10 of stainless steel or Teflon. The latter is particularly adapted for our uses in view of its machinability, its self-lubricating properties, and its inertness to chemical activity. The taps 17—20 may likewise be of brass and sweated into counter-sunk bores 21—24 passing through the wall of the barrel. The terminals of the taps are provided with standard tubing fittings 34.

The unit so constructed does not require any separate lubricant material and thereby contamination of samples is avoided which otherwise may occur with conventional barrel-plug assemblies. Likewise, the lubricant-free construction permits the delivery of repeated samples of precisely the same size.

In routine analytical procedures, it is imperative that the apparatus be capable of repeatedly delivering uniformly sized samples. Our apparatus delivers accurate and precise samples which assure repeatable analytical precision. Analytical procedures are simplified significantly by the use of our device thereby making possible the adaptation of gas chromatography to automatic analysis.

Figure 1:
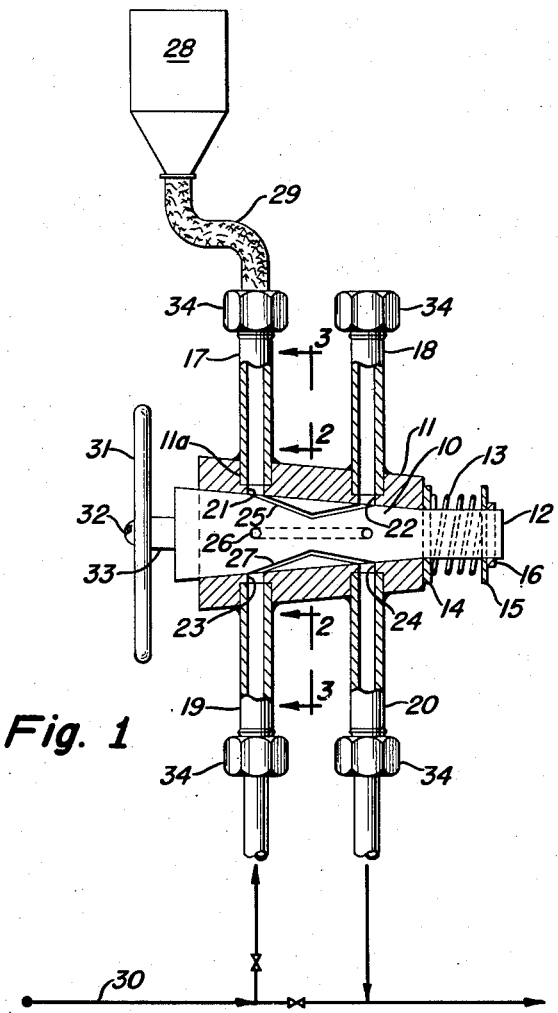
Figure 1 is a side elevation, partly in section.
Figure 3:
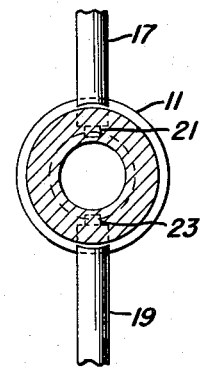
Figure 3 is a section taken along the line 3—3 in Figure 1.
Figure 4:
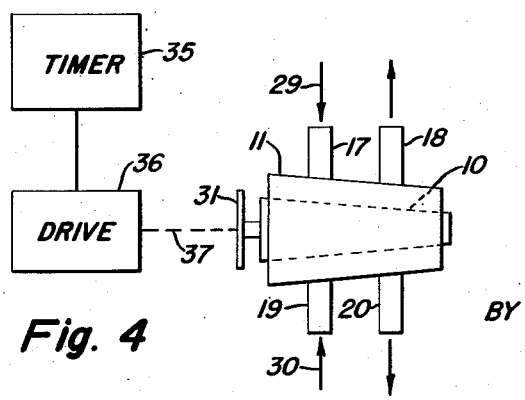
Figure 4 is a schematic view of an automatic system employing our sampling device.

In Figure 4 we have schematically illustrated a means for operating the device of Figures 1 to 3 in an automatic manner. A timer 35 controls the actuation of drive means 36 which in turn rotates the plug 10 in accordance with a preselected program of operation through link 37. This program is correlated with sample introduction, preparation of associated chromatographic columns for analysis, introduction of the sample into the prepared column, analysis of the sample, and segregation of the spent column for subsequent use.

The drive 36 may comprise a ratchet relay acting on a gear substituted for handle 31. Likewise, the drive 36 may comprise a constant speed motor, drive shaft, and gear train.

From the above, it will be apparent that we have attained the objects of our invention and, although it has been described with reference to a preferred embodiment thereof, it is to be understood that this is by way of illustration only. Accordingly, it is contemplated that modifications and variations may be made in the apparatus by those skilled in the art in view of our description without departing from the spirit of the invention.

What we claim is:

1. A sampling device comprising a tubular member, a rotatable plug member disposed within said tubular member, a first pair of conduit means communicating through the wall of said tubular member, a second pair of conduit means peripherally displaced with respect to said first pair of conduit means, said second pair of conduit means communicating with said tubular member through the wall thereof, and a plurality of channel means within the body of said plug adapted to be brought into register alternately with said first pair of conduit means and said second pair of conduit means.

2. A sampling device comprising a tubular member, a rotatable plug member disposed within said tubular member, and first conduit means comprising a pair of longitudinally spaced taps communicating with the interior of said tubular member, a second conduit means comprising a second pair of taps communicating with the interior of said tubular member, each pair of said taps being longitudinally spaced the same distance and said pairs being arranged in diametrically opposed array, and a plurality of channel means within said plug whereby a variety of volumetric samples may be taken from a first flowing stream and injected in a uniform manner into a second flowing stream in a selective and precise manner.

3. An apparatus for introducing measured samples of fluids into a flowing stream which comprises in combination a housing, a tapered bore in said housing, a tapered plug rotatably disposed within said tapered bore, a first pair of conduit members in said housing and communicating with said tapered bore, said conduit members being arranged in axial alignment with respect to the longitudinal axis of said plug, a second pair of conduit members communicating with said tapered bore and peripherally remote from said first pair of conduit members, and a plurality of channels each having an inlet and an outlet adapted to be brought into register with each of said pairs of conduit members.

4. An apparatus for measuring and introducing uniform selected quantities of fluids into a flowing stream which comprises in combination a housing, an inner conically tapered bore within said housing, a first pair of spaced conduits on said housing and in fluid communication with the inner conically tapered bore, a second pair of spaced conduits disposed on said housing diametrically to said first pair of conduits, a conically tapered plug member adapted to seat within said tapered bore, said plug member having at least one measuring and flow channel extending longitudinally within said plug and having spaced inlet and outlet, said spacing corresponding to the spacing of said conduit members, whereby alignment of said plug permits flow through said channel in series with flow through said first conduit members and whereby flow may be blocked completely by rotation of the plug to isolate the measured sample within the channel, and whereby fluids may be discharged from the channel by flow induced and through by said second pair of conduit members when the inlet and outlet of the channel in the plug are rotated into alignment with the said second pair of conduit members.

5. The apparatus of claim 3 which includes means for rotating said plug comprising drive means, and a timer means for controlling said drive means.

References Cited in the file of this patent
UNITED STATES PATENTS
2,089,796    Hopf et al. _____ Aug. 10, 1937